(12) United States Patent
Apte et al.

(10) Patent No.: US 9,912,759 B2
(45) Date of Patent: Mar. 6, 2018

(54) DYNAMICALLY GENERATING SOLUTION STACKS

(71) Applicant: International Business Machines Corporation, Armonk, NY (US)

(72) Inventors: Ajay A. Apte, Austin, TX (US); Ran R. Jiang, Beijing (CN); Tan Jiang, Beijing (CN); Lin Sun, Morrisville, NC (US); Shu Chao Wan, Beijing (CN); Li Yi, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 14/748,626

(22) Filed: Jun. 24, 2015

(65) Prior Publication Data

US 2016/0380920 A1    Dec. 29, 2016

(51) Int. Cl.
     *G06F 15/16*        (2006.01)
     *H04L 29/08*        (2006.01)
     *H04L 12/911*      (2013.01)

(52) U.S. Cl.
     CPC ............ *H04L 67/16* (2013.01); *H04L 47/821* (2013.01); *H04L 67/10* (2013.01); *H04L 67/303* (2013.01)

(58) Field of Classification Search
     USPC ......................................................... 709/219
     See application file for complete search history.

(56) References Cited

U.S. PATENT DOCUMENTS

| | | | | |
|---|---|---|---|---|
| 6,449,618 | B1 * | 9/2002 | Blott .................. | G06F 17/30516 |
| 7,185,342 | B1 * | 2/2007 | Carrer .................. | G06F 9/5038 |
| | | | | 709/219 |
| 7,669,212 | B2 * | 2/2010 | Alao .................. | G06Q 30/0209 |
| | | | | 725/32 |
| 8,245,246 | B2 * | 8/2012 | Graser .................. | G06F 9/548 |
| | | | | 707/626 |
| 8,494,442 | B2 * | 7/2013 | Sato .................... | H04B 7/15557 |
| | | | | 455/11.1 |

(Continued)

FOREIGN PATENT DOCUMENTS

| | | |
|---|---|---|
| WO | 2014039919 A1 | 3/2014 |
| WO | 2014088541 A1 | 6/2014 |

OTHER PUBLICATIONS

"Creating an IBM® Pattern Software Component Project", pp. 1-6, <http://www-01.ibm.com/support/knowledgecenter/api/content/nl/en-us/SSCR9A_2.0.0/doc/iwd/pat_createswpkg.html>, Product released on Aug. 29, 2014, Grace Period Disclosure.

(Continued)

*Primary Examiner* — Alicia Baturay
(74) *Attorney, Agent, or Firm* — Bryan D. Wells

(57) ABSTRACT

Embodiments of the present disclosure dynamically generate solution stacks. In one embodiment, a request to deploy a service in a cloud computing environment is received. A service repository is queried for data that describes one or more requirements of the service. One or more prerequisite services are identified based, at least in part, on the requirements of the service. A solution stack model is dynamically generated from (i) a stack service model of the service and (ii) the one or more prerequisite services, wherein the solution stack model is based, at least in part, on the requirements of the service.

20 Claims, 7 Drawing Sheets

(56) References Cited

U.S. PATENT DOCUMENTS

| | | | | |
|---|---|---|---|---|
| 8,572,706 | B2* | 10/2013 | Lucovsky | H04L 63/0245 370/252 |
| 8,627,426 | B2* | 1/2014 | Lucovsky | G06F 9/45533 455/456.1 |
| 8,805,971 | B1* | 8/2014 | Roth | G06F 9/5072 709/203 |
| 8,856,077 | B1* | 10/2014 | Roth | H04L 67/1095 707/638 |
| 8,898,285 | B2* | 11/2014 | Tingstrom | G06F 17/30899 709/224 |
| 8,910,132 | B2* | 12/2014 | Kolesnikov | G06F 8/61 717/140 |
| 8,931,038 | B2* | 1/2015 | Pulier | G06F 9/45558 709/226 |
| 8,984,396 | B2* | 3/2015 | Tingstrom | G06F 17/227 707/690 |
| 9,069,599 | B2* | 6/2015 | Martinez | G06F 9/455 |
| 9,071,522 | B2* | 6/2015 | Lucovsky | H04L 63/0245 |
| 9,075,788 | B1* | 7/2015 | Roth | G06F 11/3006 |
| 9,210,178 | B1* | 12/2015 | Roth | H04L 63/105 |
| 9,280,335 | B2* | 3/2016 | Adi | G06F 8/63 |
| 9,288,252 | B2* | 3/2016 | Stroomer | H04L 67/1027 |
| 9,436,685 | B2* | 9/2016 | Roth | G06F 17/3002 |
| 9,448,790 | B2* | 9/2016 | Collison | G06F 8/71 |
| 9,560,079 | B1* | 1/2017 | Lucovsky | H04L 63/0245 |
| 9,595,014 | B1* | 3/2017 | Vohra | G06Q 10/06 |
| 9,613,368 | B2* | 4/2017 | Gallagher | G06Q 30/06 |
| 9,716,624 | B2* | 7/2017 | Zeyliger | H04L 41/0816 |
| 2006/0224398 | A1* | 10/2006 | Lakshman | G06Q 10/08 705/333 |
| 2010/0228836 | A1* | 9/2010 | Lehtovirta | H04L 12/00 709/220 |
| 2012/0109905 | A1* | 5/2012 | Tingstrom | G06F 17/227 707/690 |
| 2012/0110093 | A1* | 5/2012 | Tingstrom | G06F 17/30309 709/206 |
| 2014/0075032 | A1 | 3/2014 | Vasudevan et al. | |
| 2015/0089494 | A1* | 3/2015 | Beak | G06F 9/45558 718/1 |
| 2015/0120900 | A1* | 4/2015 | Sahoo | G06F 21/6227 709/223 |
| 2015/0143355 | A1* | 5/2015 | Tingstrom | G06F 8/65 717/170 |
| 2015/0295844 | A1* | 10/2015 | Perreira | G06F 9/4843 709/226 |
| 2016/0127633 | A1* | 5/2016 | Juhlin | H04N 5/23206 348/143 |
| 2016/0373405 | A1* | 12/2016 | Miller | H04L 63/0236 |
| 2016/0381151 | A1* | 12/2016 | Apte | H04L 67/16 709/226 |

OTHER PUBLICATIONS

"IBM PureApplication System W2500 V2.0 documentation", 1 page, IBM Knowledge Center, <http://www-01.ibm.com/support/knowledgecenter/SSCR9A2.0.0/pv_welcome.html>, Product released on Aug. 29, 2014, Grace Period Disclosure.

"IBM PureApplication Software V2.0 delivers enhancements for mission-critical production environments with improvements for continuous availability, disaster recovery, and serviceability", IBM United States Software Announcement 214-335 (Jul. 29, 2014), announcing planned product availability date of Aug. 29, 2014, <http://w3-01.ibm.com/sales/ssi/rep_is/5/897/ENUS214-335/ENUS214-335.PDF>, Grace Period Disclosure.

Apte et al., "Dynamically Generating Solution Stacks", U.S. Appl. No. 14/852,653, filed Sep. 14, 2015, pp. 1-33.

Appendix P, List of IBM Patents or Patent Applications Treated as Related, dated Sep. 14, 2015, pp. 1-2.

* cited by examiner

DYNAMICALLY GENERATING SOLUTION STACKS

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) IBM PureApplication System W2500 V2.0 Documentation, Product released on Aug. 29, 2014.

(ii) "Creating an IBM® Pattern Software Component Project," Product released on Aug. 29, 2014, See Step 8, "Dependent Products."

(iii) "IBM PureApplication Software V2.0 delivers enhancements for mission-critical production environments with improvements for continuous availability, disaster recovery, and serviceability," IBM United States Software Announcement 214-335 (Jul. 29, 2014), announcing planned product availability date of Aug. 29, 2014.

BACKGROUND OF THE INVENTION

The present invention relates generally to the field of cloud computing, and more particularly to dynamically generating solution stacks.

Cloud computing is a model of service delivery for enabling convenient, on-demand network access to a shared pool of configurable computing resources. In this regard, shared resources may be provided to computers and other devices as a utility over a network, such as a private network and/or a public network (e.g., the Internet). The resources can include computation/processing, software applications, data access, data management, and data storage. End users need not know the specific location or other details of a cloud infrastructure. Nonetheless, end users can access cloud based applications through a web browser or a light weight desktop or mobile application, while business software and data can be stored in the cloud.

SUMMARY

According to one embodiment of the present disclosure, a method for dynamically generating solution stacks is provided. The method includes receiving, by one or more computer processors, a request to deploy a service in a cloud computing environment; querying, by one or more computer processors, a service repository for data that describes one or more requirements of the service; identifying, by one or more computer processors, one or more prerequisite services based, at least in part, on the requirements of the service; and dynamically generating, by one or more computer processors, a solution stack model from (i) a stack service model of the service and (ii) the one or more prerequisite services, wherein the solution stack model is based, at least in part, on the requirements of the service.

According to another embodiment of the present disclosure, a computer program product for dynamically generating solution stacks is provided. The computer program product comprises a computer readable storage medium and program instructions stored on the computer readable storage medium. The program instructions include program instructions to receive a request to deploy a service in a cloud computing environment; program instructions to query a service repository for data that describes one or more requirements of the service; program instructions to identify one or more prerequisite services based, at least in part, on the requirements of the service; and program instructions to dynamically generate a solution stack model from (i) a stack service model and (ii) the one or more prerequisite services, wherein the solution stack model is based, at least in part, on the requirements of the service.

According to another embodiment of the present disclosure, a computer system for dynamically generating solution stacks is provided. The computer system includes one or more computer processors, one or more computer readable storage media, and program instructions stored on the computer readable storage media for execution by at least one of the one or more processors. The program instructions include program instructions to program instructions to receive a request to deploy a service in a cloud computing environment; program instructions to query a service repository for data that describes one or more requirements of the service; program instructions to identify one or more prerequisite services based, at least in part, on the requirements of the service; and program instructions to dynamically generate a solution stack model from (i) a stack service model and (ii) the one or more prerequisite services, wherein the solution stack model is based, at least in part, on the requirements of the service.

DETAILED DESCRIPTION

Figure 1:
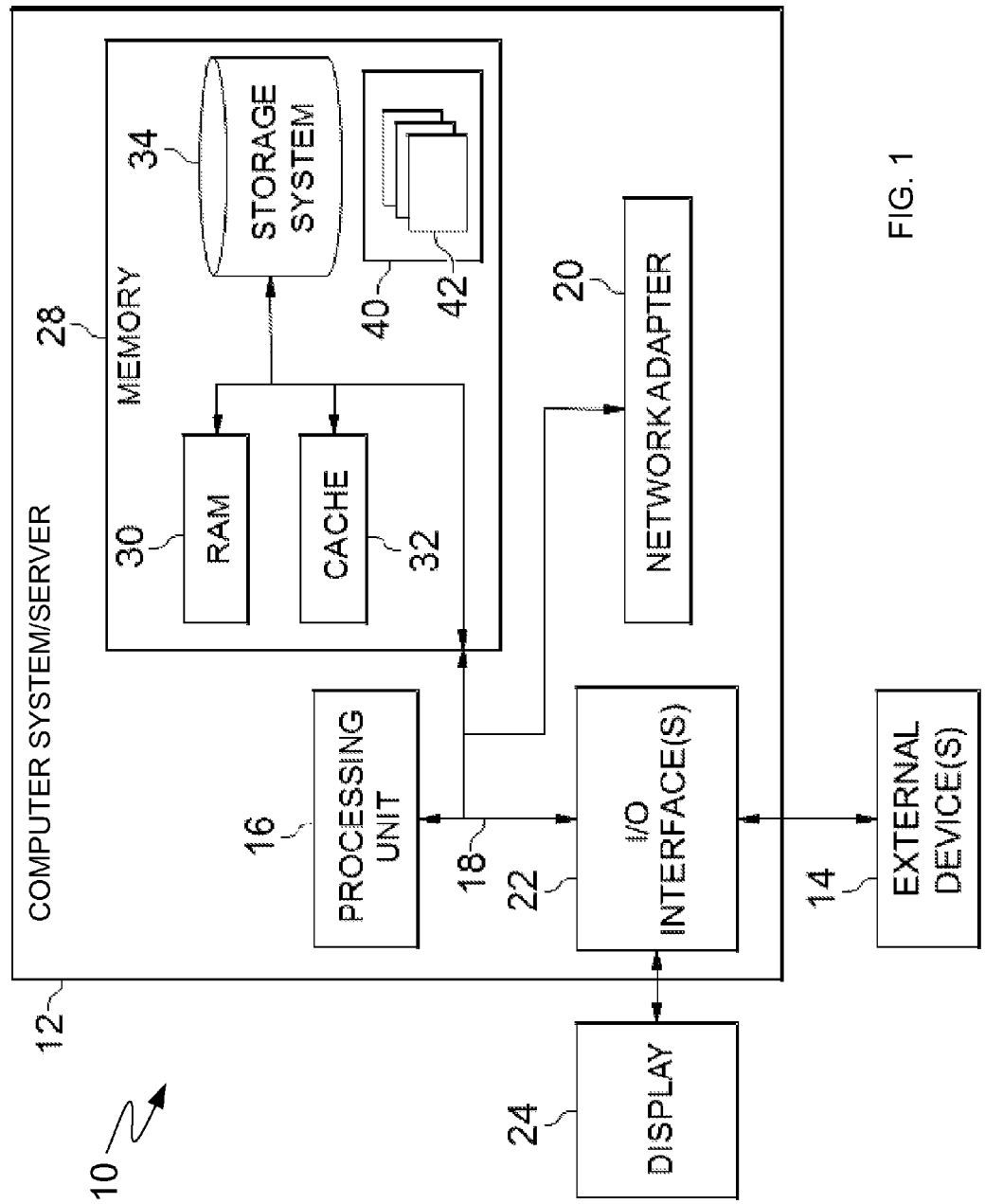
FIG. 1 is a functional block diagram that depicts a cloud computing node, in accordance with embodiment of the present disclosure.

Cloud platforms host cloud services that can be combined to form various solution stacks. A solution stack is a collection of services that makes it possible to complete a particular task. There are various kinds of cloud services in the solution stack. Some services are low-level and provide infrastructure resources (e.g., operating systems, block storage, and network components). Other services are mid-level and provide middleware capabilities (e.g., application servers and databases). Low-level and mid-level services are referred to as base services herein. Yet other services are built on top of base services to fulfill various requirement(s).

These services are referred to as stack services herein. In general, stack services require, as prerequisite services, one or more base services. A solution stack includes both base services and stack services.

In general, there are at least three types of entities involved with creating, managing, and deploying cloud services. One type entity is a service provider. A service provider creates stack services for inclusion in a catalog of cloud services. Another type of entity is a cloud user. A cloud user selects a stack service from the catalog of cloud services. The selected stack service is deployed in the cloud as an instance of the solution stack (i.e., the stack service(s) and any prerequisite service(s)). Yet another type of entity is a cloud administrator. A cloud administrator manages the catalog of cloud services and any instances that are deployed in the cloud.

Embodiments of the present disclosure recognize that is advantageous to decouple stack services from base services. While many stack services have similar prerequisite base services, some stack service providers provide entire solution stacks, as monolithic packages, to cloud platforms. Because a solution stack that includes one or more prerequisite base is more complex than the stack service itself, developing, testing, and maintaining a monolithic solution stack is also more complex. If base services are decoupled from stack services (i.e., provided separately in the catalogue of cloud services), stack services can share base services (i.e., base services can be reused). Sharing base services can allow stack service providers to focus on developing, testing, and maintaining respective stack services while other service providers develop, test, and maintain the prerequisite base services.

Embodiments of the present disclosure provide a solution stack generator that dynamically composites a stack service and decoupled base services to create a solution stack model. In order to share decoupled base services amongst various stack services, the solution stack generator configures the base services in accordance with the stack service requirements that are declared by a service provider (e.g., heap size, installation directory, block storage size, or another parameter). The solutions stack generator also configures the life cycle of the base services in accordance with the requirements of the stack service (e.g., create a solution stack that skips the installation phase of middleware or activates the installation phase of the stack service between the installation and start phases of one of the prerequisite base services). In general, cloud users are not interested in the configuration requirements of base services. The solutions stack generator dynamically composites the stack services and prerequisite base services to, at least in part, simplify the experience of cloud users and allow the cloud users to focus on configuring the stack services to their requirements. In some embodiments, cloud users can deploy stack services without having any knowledge of the prerequisite base services.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
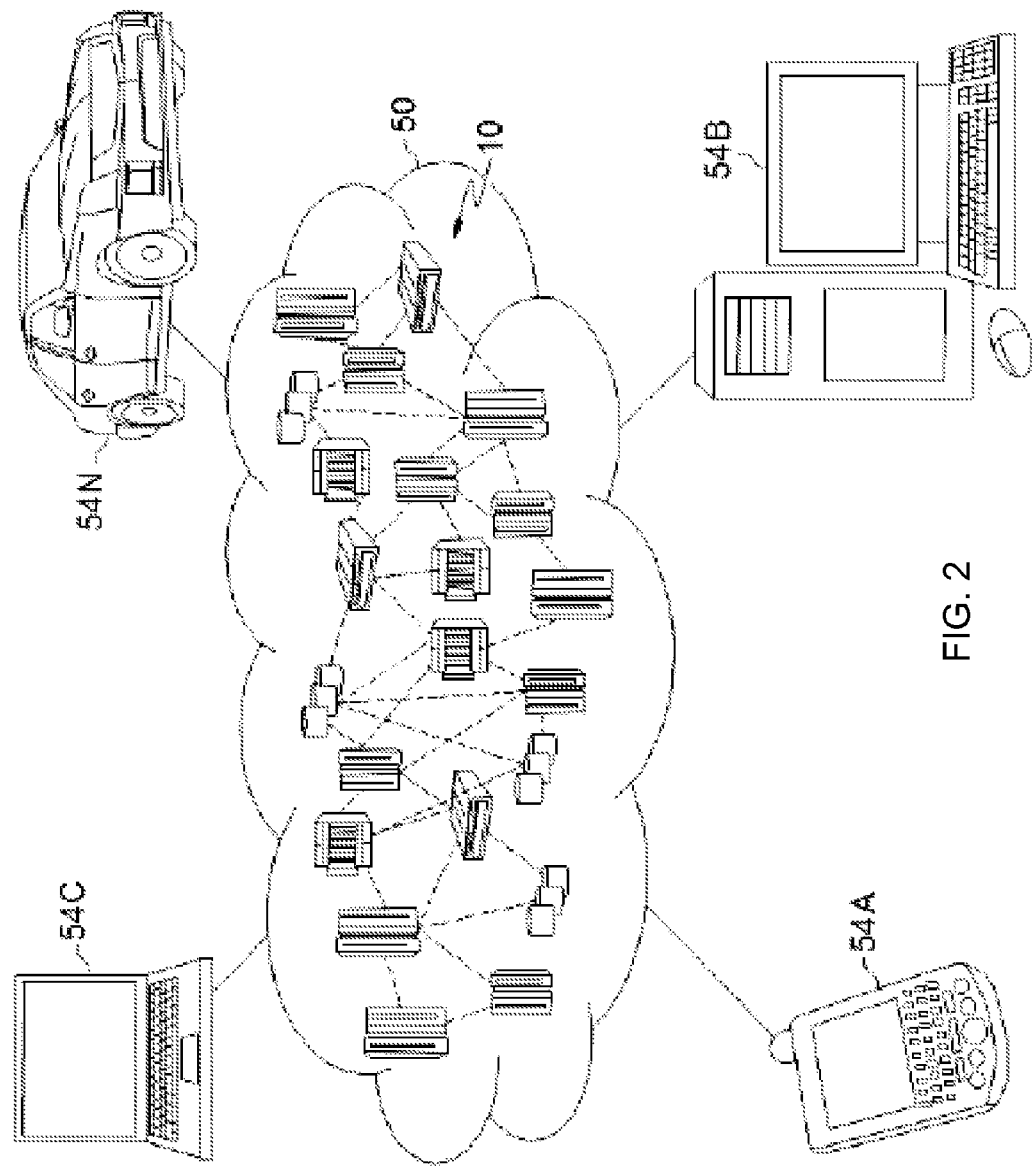
FIG. 2 is a block diagram that depicts a cloud computing environment, in accordance with an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Figure 3:
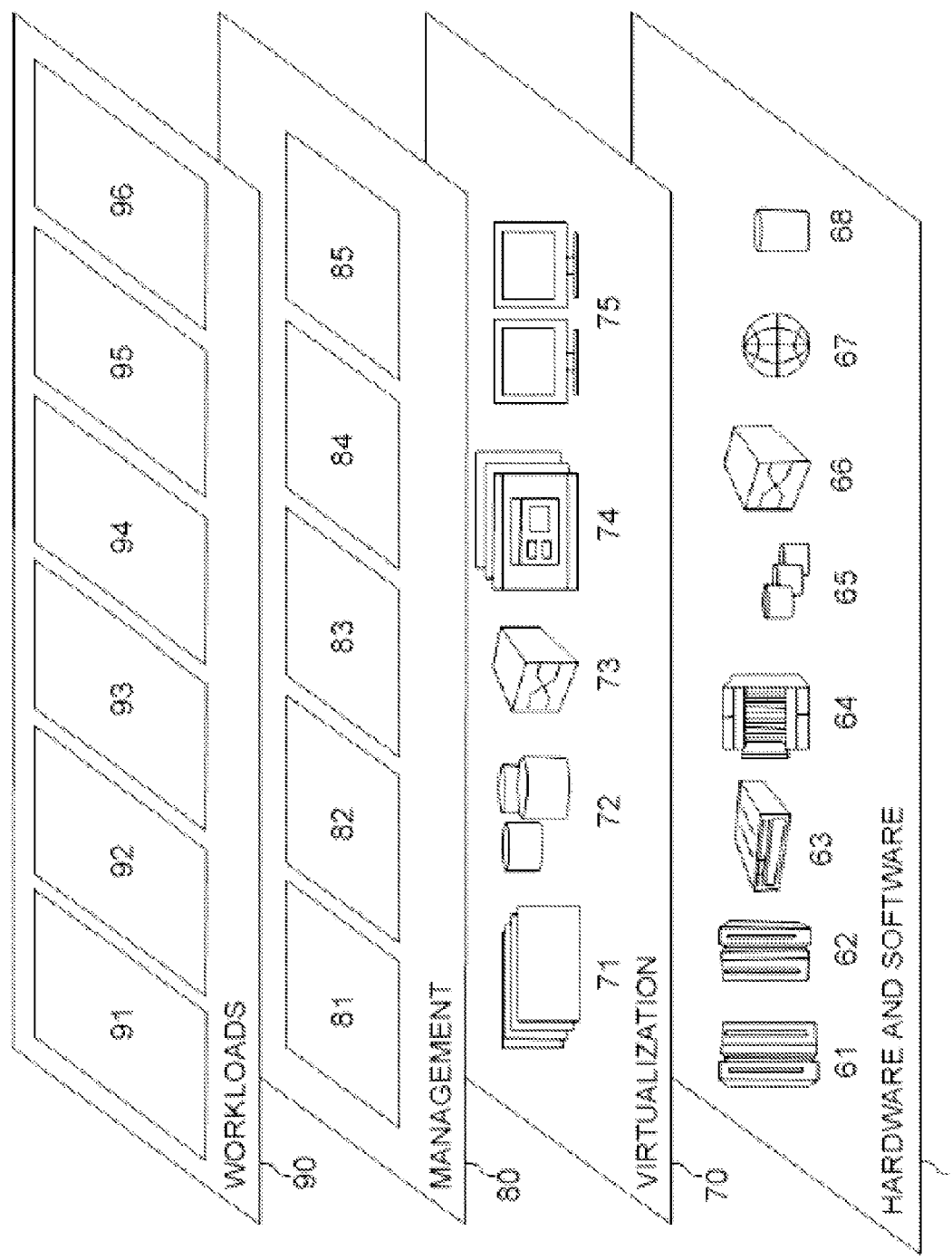
FIG. 3 is a block diagram that depicts abstraction model layers, in accordance with an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop(s) 96.

Figure 4:
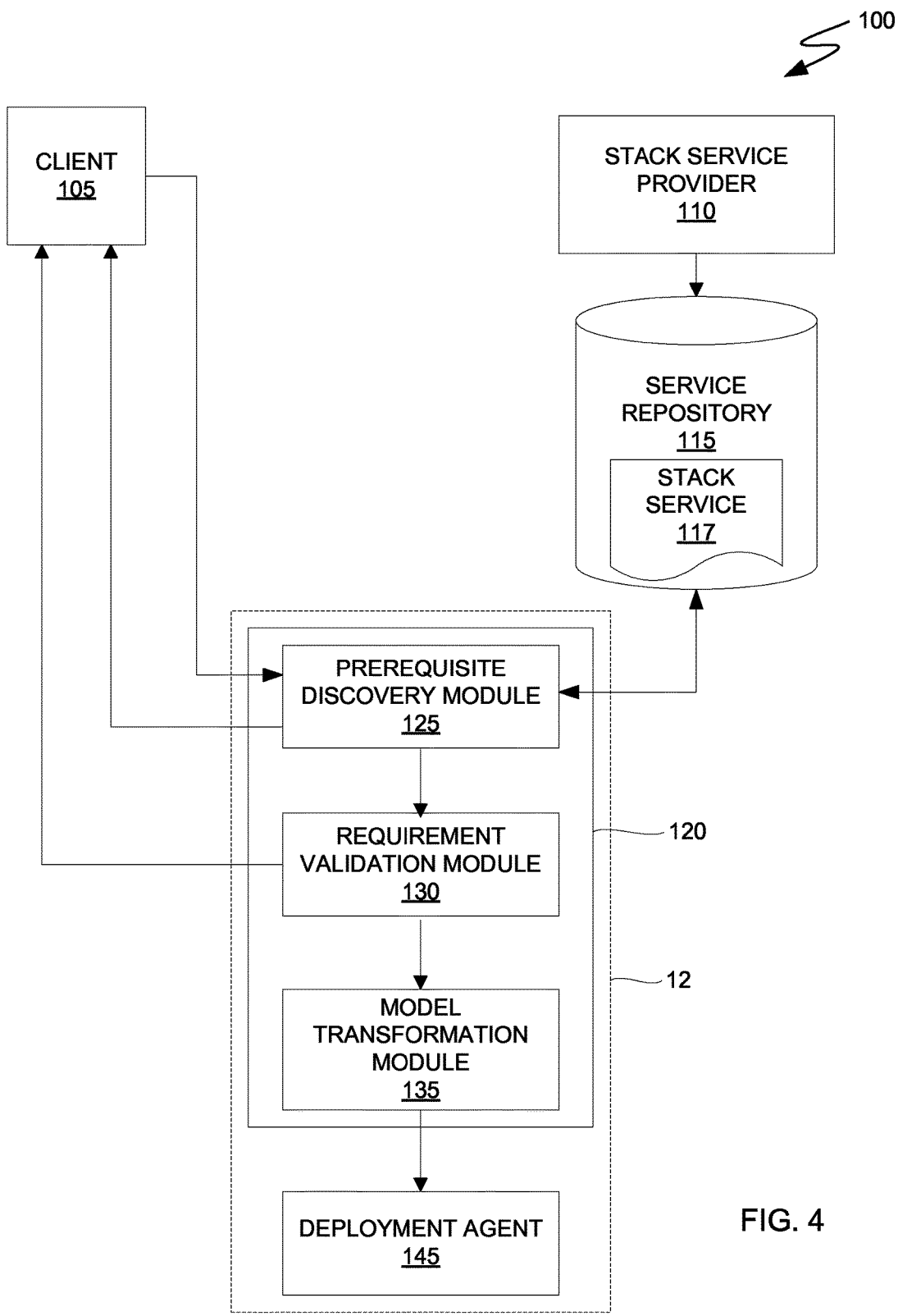
FIG. 4 is a block diagram that depicts a cloud computing environment for dynamically generating a solution stack, in accordance with an embodiment of the present disclosure.

FIG. 4 is a functional block diagram that depicts cloud computing environment 100, in accordance with an embodiment of the present disclosure. As depicted in FIG. 4, client 105, stack service provider 110, service repository 115, and computer system/server 12, are communicatively connected via a public network (e.g., the Internet) and/or a private network (e.g., a local area network (LAN), a wide area network (WAN), or another private network). In some embodiments, computer system/server 12 is a distributed cloud computing device, wherein tasks are performed by communicatively connected remote processing devices.

FIG. 4 depicts an example of cloud computing environment 100 in which computer system/server 12 receives, from Client 105, a request to deploy a stack service (e.g., stack service 117). In some embodiments, client 105 transmits the request at the behest of a user (i.e., a person). In other embodiments, client 105 communicates the request at the behest of an automated process executing on client 105. In some embodiments, client 105 interfaces with computer system/server 12 via a user portal through which the request to deploy a stack service is provided. As used herein, the term "client" means a computing device or system, such as a workstation, desktop computer, mobile computer, tablet computer or the like that resides client-side in a client/server(s) relationship. While FIG. 4 depicts a single client, the number of clients to which computer system/server 12 is communicatively connected is not a limitation of the present disclosure.

Computer system/server 12, at least in part, provides resource provisioning 81. For example, computer system/server 12 executes solution stack generator module 120 in order to deploy the requested stack service (e.g., stack service 117). In the embodiment depicted in FIG. 4, solution stack generator module 120 is one of program modules 42 of computer system/server 12. Solution stack generator module 120 includes a plurality of sub-modules that composite a stack service and one or more base services to dynamically generate a solution stack model. In the embodiment depicted in FIG. 4, for example, solution stack generator module 120 includes prerequisite discovery module 125, requirement validation module 130, and model transformation module 135. In embodiments where computer system/server 12 is a distributed cloud computing device, prerequisite discovery module 125, requirement validation module 130, and model transformation module 135 can be located in local and/or remote computer system storage media, including remote and/or local memory storage devices. The functionality of prerequisite discovery module 125, requirement validation module 130, and model transformation module 135 is described herein with respect to FIGS. 6 and 7.

In order to generate a solution stack for the requested stack service, solution stack generator module 120 queries service repository 115. Service repository 115 is a data repository that can be written to and read by one or both of stack service provider 110 and computer system/server 12. One or more stack services (e.g., stack service 117) and associated metadata are stored to service repository 115. As described herein with respect to FIG. 5, the metadata describes the capabilities, configurable parameters, and various requirements of stack service 117. In addition, service repository 115 stores one or more base services (not shown) and any associated metadata in the embodiment depicted in FIG. 4. In some embodiments, service repository 115 may be written to and read by programs and entities outside of cloud computing environment 100 in order to populate service repository 115 with base services and/or other stack services. While FIG. 4 depicts a single a single data repository and a single stack service provider, the number of stack service providers and the number of data repositories to which computer system/server 12 is communicatively connected is not a limitation of the present disclosure. In some embodiments, computer system/server 12 is communicatively connected to a plurality of data repositories that are populated by one or more content providers (i.e., providers of stack and/or base services).

Solution stack generator module 120 dynamically generates a solution stack model based, at least in part, on the requirements that stack service provider 110 declares for stack service 117. While a user of client of 105 may choose to configure various parameters of stack service 117, the requirements that stack service provider 110 generally do not require that the user have knowledge of the base services or any other prerequisite services. Solution stack generator module 120 dynamically discovers the prerequisite services and constructs the solution stack model from stack service 117 and a pool of shared services, as described herein with respect to FIG. 6.

After generating a solution stack model for the requested stack service, solution stack generator module 120 sends the generated solution stack model to deployment agent 145. Deployment agent 145 deploys the model to the cloud to enable one or more instance(s) of the stack service. In the embodiment depicted in FIG. 4, deployment agent 145 resides and executes on computer system/server 12. In other embodiments, deployment agent 145 resides and/or executes on another computer device that is communicatively connected to computer system/server 12. In yet other embodiments, a plurality of computing devices that are communicatively connected to computer system/server 12 provide the functionality attributed to deployment agent 145.

Figure 5:
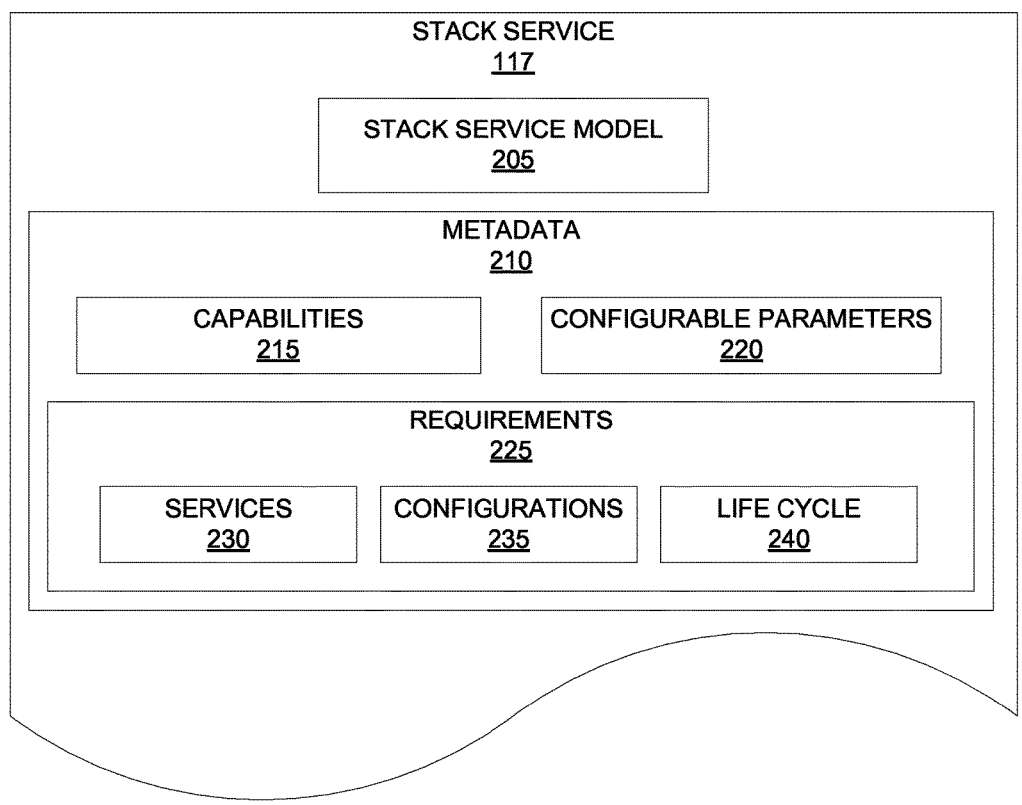
FIG. 5 is a block diagram that depicts data types that describe various aspects of a stack service, in accordance with an embodiment of the present disclosure.

FIG. 5 is a block diagram that depicts data types that describe various aspects of a stack service, in accordance with an embodiment of the present disclosure. In order to dynamically composite stack service 117 and decoupled prerequisite base services, solution stack generator module 120 queries service repository 115 for stack service 117. FIG. 5 depicts one example of an embodiment in which a stack service (e.g., stack service 117) is described by a stack service model (e.g., stack service model 205) and metadata (e.g., metadata 210), wherein the metadata describes the capabilities (e.g., capabilities 215), configurable parameters (e.g., configurable parameters 220), and various requirements (e.g., requirements 225) of the stack service model. Service providers declare these properties so that, among other things, the required prerequisite base services can be obtained from a pool of shared base services and dynamically composited to form various solution stack models. Persons of ordinary skill in the art will understand that a base service can be a prerequisite service of a different base service (e.g., an infrastructure service can be a prerequisite base service for a middleware service). Accordingly, service providers can similarly declare the properties of base services.

In FIG. 5, metadata 210 describes, at least in part, the capabilities of stack service model 205 (i.e., capabilities 215). Capabilities 215 define the service that stack service model 205 provides and the applicable version of stack service model 205.

In FIG. 5, metadata 210 also describes which parameters of stack service model 205 are configurable (i.e., configurable parameters 220). In general, cloud services include one or more parameters that are configured by a user (e.g., a user of client 105) or another cloud service before the solution stack model is deployed in the cloud. In various embodiments, configurable parameters 220 include installation directories, heap sizes, transaction time-out thresholds, max session counts, and/or various other parameters.

In FIG. 5, metadata 210 also describes various requirements of stack service model 205 (i.e., requirements 225). In the embodiment depicted in FIG. 5, requirements 225 include service requirements 230, configuration requirements 225, and life cycle requirements 240.

Service requirements 230 define the prerequisite service(s) that stack service model 205 requires (e.g., infrastructure service(s), middleware service(s), or other stack service(s)). Persons of ordinary skill in the art will understand that a stack service (i.e., a service that is not considered a base service) can be a prerequisite service for another stack service. In some embodiments, service requirements 230 also define the versions of the prerequisite services that are compatible with stack service model 205. In such embodiments, service requirements 230 define compatible version(s) using one of three formats. Using a first format, service requirements 230 identify a specific version number of a prerequisite service. The first format indicates that only the version of the prerequisite service that has the identified number is considered a compatible service. Using a second format, service requirements 230 identify a range of version numbers of a prerequisite service. The second format indicates that any version of the prerequisite service having a version number within the identified range of version numbers is considered a compatible service. Using a third format, service requirements 230 associate a "wildcard" with a prerequisite service. The third format indicates that any version of the prerequisite service is considered a compatible service. In some embodiments, service requirements 230 can define compatible versions of prerequisite services using a combination of the three formats if metadata 210 identifies a plurality of prerequisite services.

Configuration requirements 235 define the parameters that are propagated from stack service model 205 to one or more prerequisite services (or from a prerequisite service to another prerequisite service). The value of a propagated parameter can be a simple value or an expression. If, for example, configuration requirements 235 includes the heap size, the value of the propagated heap size parameter can be a simple number, such as "2048" (i.e., 2048 MB). If, for example, configuration requirements 235 includes the binary installation directory location, the value of the propagated installation directory parameter can be an expression, such as "${this.binaryInstallDir}/../AppServer."

Life cycle requirements 240 define one or more life cycle ordering rules that govern the order in which instances of the solution stack model execute various life cycle actions of stack service model 205 and the associated prerequisite service(s). In general, cloud platforms perform several life cycle actions, including installing services, configuring services, "starting" services, and "stopping" services. When solution stack generator module 120 generates a solution stack model, it defines an execution order for the stack service and the prerequisite service(s). The present disclosure provides various rules by which service providers can order and interweave the life cycle actions of the stack service and prerequisite service(s). The life cycle actions can be interwoven in the sense that some life cycle actions of the stack service can be executed before the life cycles of prerequisite services are complete. Similarly the life cycle actions of prerequisite services can be interwoven. In one embodiment, life cycle requirements 240 associate a number with each life cycle action of the stack service and the prerequisite service(s). If a negative one is associated with a life cycle action, the life cycle action is skipped. If two life cycle actions are associated with the same number, the two life cycle actions are executed in parallel. If a first number is less than a second number and a first life cycle action is associated with the first number and a second life cycle action is associated with the second number, the first life cycle action is executed before the second life cycle action. Using these rules, the life cycle actions of prerequisite services can be interwoven with life cycle actions of the stack service. These rules are also discussed herein with respect to FIG. 7.

Figure 6:
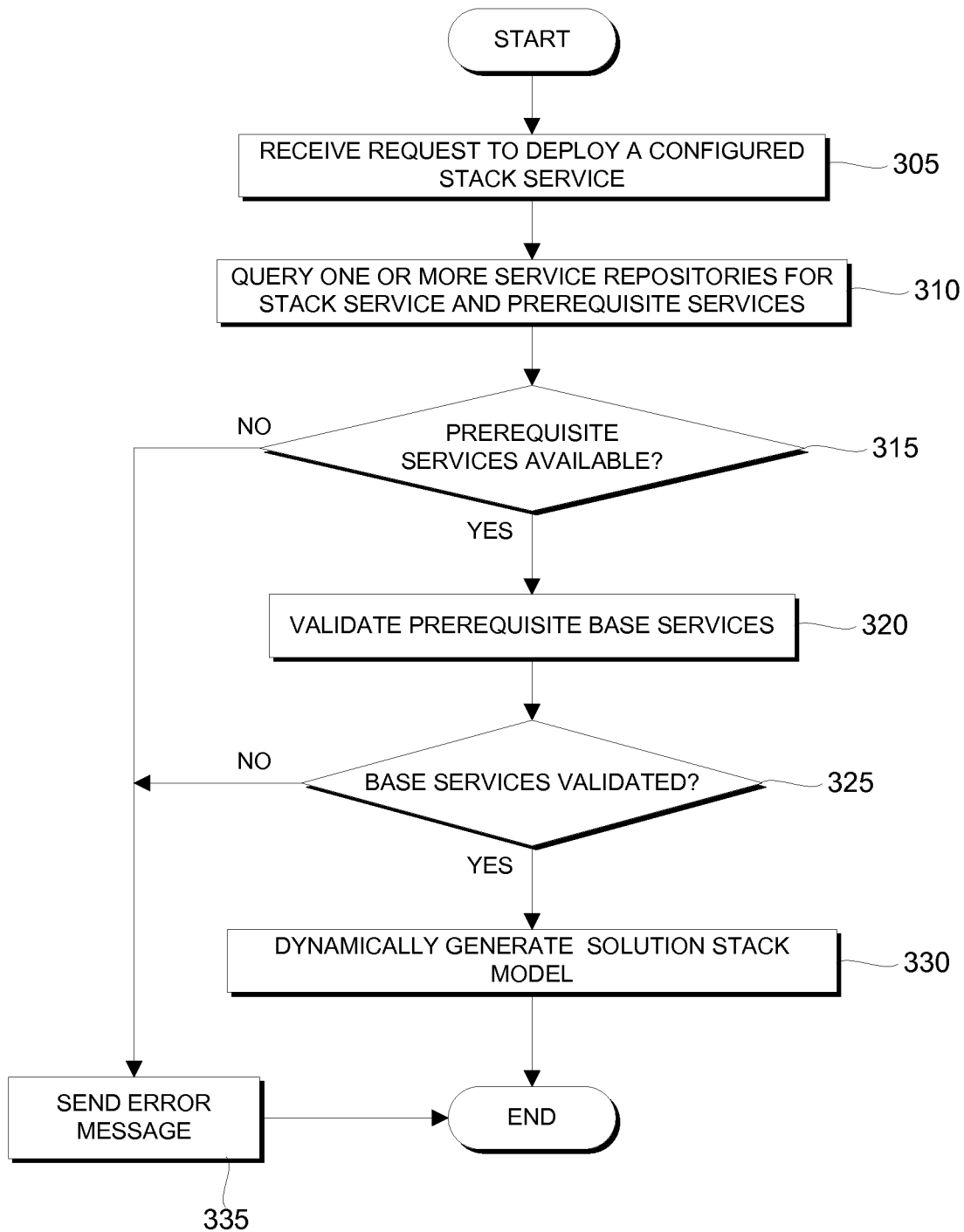
FIG. 6 is a flowchart that depicts a method for dynamically generating a solution stack, in accordance with an embodiment of the present disclosure.

FIG. 6 is a flowchart depicting operations for dynamically generating a solution stack model on computer system/server 12 within cloud computing environment 100, in accordance with an embodiment of the present disclosure.

In operation 305, prerequisite discovery module 125 receives a request to deploy stack service 117 from client 105. In some embodiments, users of client 105 can configure one or more of configurable parameters 220 prior to sending the request to computer system/server 12. Accordingly, the request can include, for example, a name for the requested instance of the stack service, an installation directory location, a username, a password, and/or another user-configurable parameter.

In operation 310, prerequisite discovery module 125 queries service repository 115 for stack service model 205 and metadata 210. Based, at least in part, on service requirements 230, prerequisite discovery module 125 also queries service repository 115 for compatible services.

In decision 315, prerequisite discovery module 125 determines if service repository 115 includes the prerequisite services based, at least in part, on the results of the query. As described herein with respect to FIG. 5, stack service provider 110 can identify compatible version(s) of a prerequisite service in one of three ways. Accordingly, prerequisite discovery module 125 determines if service repository 115 includes prerequisite services that are exact matches, range matches, or wildcard marches depending on how the prerequisite services are declared in service requirements 230. If prerequisite discovery module 125 determines that compatible prerequisite service are available (decision 315, YES branch), operation 320 is performed. If prerequisite discovery module 125 determines that service repository 115 does not include a prerequisite service or that a compatible version is not available (decision 315, NO branch), operation 335 is performed (i.e., an error message is sent to client 105).

In operation 320, requirement validation module 130 analyzes the prerequisite services to ensure that they satisfy requirements 225. In particular, requirement validation module 130 analyzes the prerequisite services to determine if they satisfy configuration requirements 235 and various life cycle rules. If configuration requirements 235 indicate that stack service 117 modifies a parameter of a prerequisite service, requirement validation module 130 determines if the prerequisite service includes the parameter. In addition, requirement validation module 130 determines if the life cycle actions of the prerequisite services are not in a predefined order and thus break one or more life cycle rules.

As discussed with respect to FIG. 5, providers of prerequisite services can declare life cycle requirements that are similar to the life cycle requirements 240. In some embodiments, one rule is that the sequence of life cycle actions for each service must be in a predefined order that proceeds from installation to configuration and then to "start." Another example of a rule that specifies a predefined order of life cycle actions is a rule that the operating system must install, configure, and "start" before any life cycle actions of the other components.

In decision 325, requirement validation module 130 determines if each of the prerequisite services is valid. If requirement validation module 130 determines that each of the prerequisite services satisfies configuration requirements 235 and the life cycle rules (decision 325, YES branch), operation 330 is performed. If requirement validation module 130 determines that at least one of the prerequisite services does not satisfy configuration requirements 235 or the life cycle rules (decision 325, NO branch), operation 335 is performed (i.e., an error message is sent to client 105).

Figure 7:
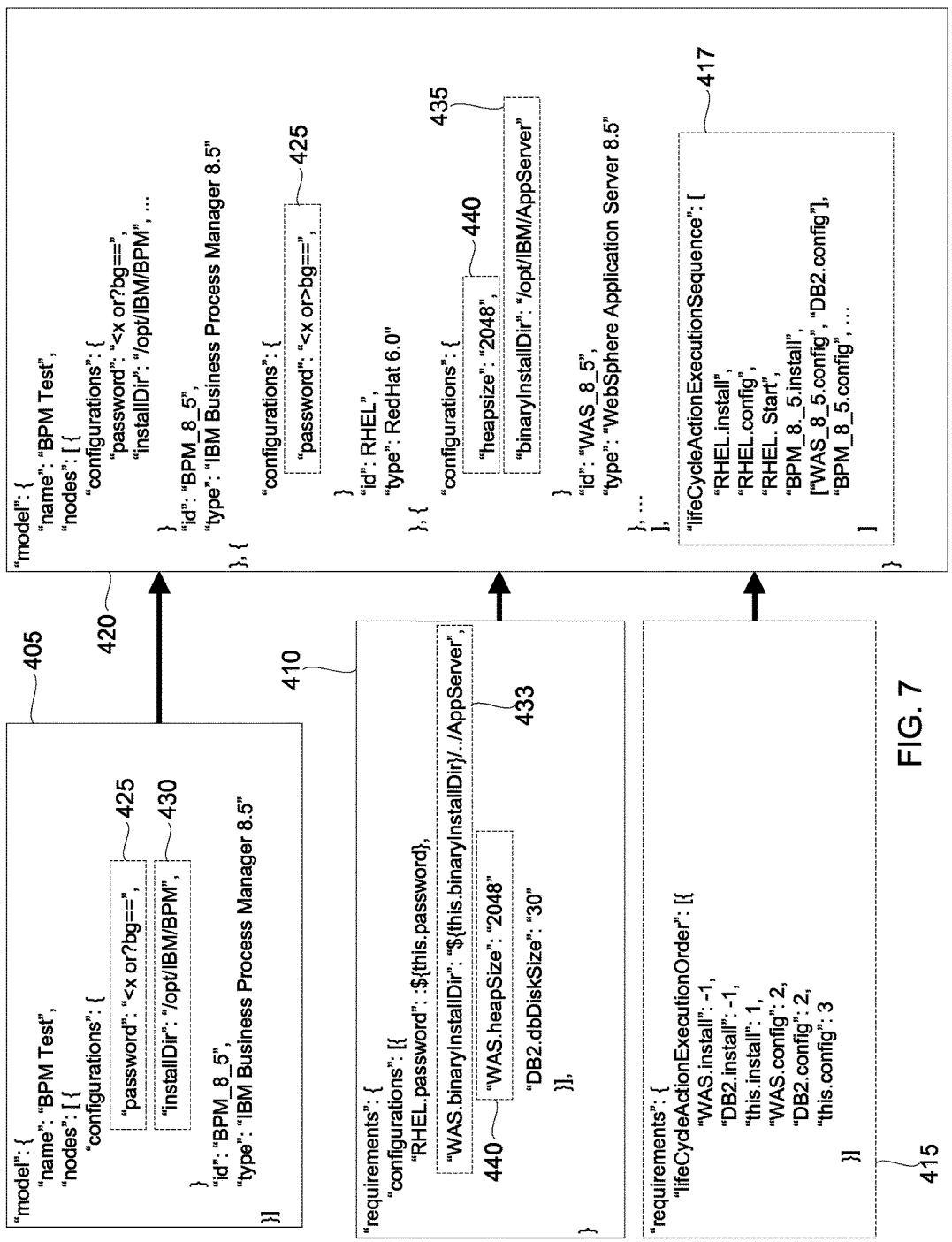
FIG. 7 is a block diagram that compares a stack service model and associated requirements to a solution stack model that is based on the stack service model, in accordance with an embodiment of the present disclosure, in accordance with an embodiment of the present disclosure.

In operation 330, model transformation module 135 transforms stack service model 205 into a solution stack model by adding the prerequisite services, propagating configurable parameters 220 to the prerequisite services, and determining a life cycle execution sequence for the solution stack. Model transformation module 135 propagates configurable parameters 220 based on the value(s) of configurable parameters 220 and configuration requirements 235. The life cycle execution sequence is based, at least in part, on any rules that are associated with life cycle requirements 240 and the default rules discussed with respected to operation 320. An example of this transformation is shown in FIG. 7. In some embodiments, the solutions stack model, including any user-configured parameters, is saved locally or in the cloud for future use.

FIG. 7 compares a stack service model and associated requirements to a solution stack model that is based on the stack service model, in accordance with an embodiment of the present disclosure. In the example depicted in FIG. 7, Business Process Manager (BPM) stack service model 405 is associated with, among other things, BPM configuration requirements 410 and BPM life cycle requirements 415. BPM solution stack model 420 is based, at least in part, on BPM stack service model 405, BPM configuration requirements 410, and BPM life cycle requirements 415.

As shown in FIG. 7, model transformation module 135 respectively propagated password 425 and heap size 440 from BPM stack service model 405 and BPM configuration requirements 410 to BPM solution stack model 420. In addition, model transformation module 135 calculated binary installation directory location 435 of "RedHat 6.0" from installation directory location 430 of BPM stack service model 405 and installation directory requirement 433 of BPM configuration requirements 410. As described herein, installation directory location 430 is a user-configurable parameter in some embodiments.

Model transformation module 135 calculated solution stack execution sequence 417 from BPM life cycle requirements 415 based, at least in part, on the rules discussed with respect to life cycle requirements 240 and the default rules discussed with respected to operation 320. Accordingly, model transformation module 135 removed skipped life cycle actions "WAS.install" and "DB2.install," added the operating system life cycle actions (i.e., "RHEL.install," "RHEL.config," and "RHEL.start"), and updated the sequence to reflect parallel life cycle actions "WAS.config"

and "DB2.config." As shown in the embodiment depicted in FIG. 7, model transformation module 135 interweaves the life cycle actions of the prerequisite service with the life cycle actions of the stack service, as discussed with respect of FIG. 6.

What is claimed is:

1. A computer program product comprising:
 a computer readable storage medium and program instructions stored on the computer readable storage medium, the program instructions comprising:
 program instructions to receive a request to deploy a service in a cloud computing environment;
 program instructions to query a service repository for data that describes one or more requirements of the service;
 program instructions to identify one or more prerequisite services based, at least in part, on the requirements of the service; and
 program instructions to dynamically generate a solution stack model from (i) a stack service model and (ii) the one or more prerequisite services, wherein the solution stack model is based, at least in part, on the requirements of the service and wherein the service and the one or more prerequisite services execute concurrently via the cloud computing environment in accordance with the requirements of the service, and wherein the program instructions to dynamically generate a solution stack model comprises:
  program instructions to interweave one or more life cycle actions of the one or more prerequisite services with one or more life cycle actions of the service based, at least in part, on a plurality of life cycle ordering rules, wherein (i) for each of the one or more prerequisite services and the service, the one or more life cycle actions are sequential, (ii) each life cycle action is associated with a respective indicator of a plurality of indicators, and (iii) wherein the plurality of life cycle ordering rules comprise:
   a first life cycle ordering rule that causes each life cycle action that is associated with a skip indicator of the plurality of indicators to be skipped; and
   a second life cycle ordering rule causes, for each indicator of the plurality of indicators that (i) is not the skip indicator and (ii) is associated with more than one life cycle action, a plurality of life cycle actions to execute concurrently.

2. The computer program product of claim 1, wherein each of the one or more prerequisite services is identified based, at least in part, on one of a specific version number and a range of compatible version numbers.

3. The computer program product of claim 1, wherein the requirements of the service include propagating a configured parameter to a specific prerequisite service of the one or more prerequisite services.

4. The computer program product of claim 3, the program instructions further comprising:
 program instructions to determine that the specific prerequisite service is unable to accept the configured parameter and, in response, send an error message to a client.

5. The computer program product of claim 3, wherein the configured parameter is a parameter that corresponds to a user-configurable setting of the specific prerequisite service.

6. The computer program product of claim 1, the program instructions further comprising:
 program instructions to determine that one or more life cycle actions of a specific prerequisite service of the one or more prerequisite services are not in a predefined order and, in response, send an error message to a client.

7. The computer program product of claim 1, wherein the one or more life cycle actions are interwoven such that one or more life cycle actions of the service are executed before all of the one or more life cycle actions of each of the one or more prerequisite services are complete.

8. The computer program product of claim 1, wherein (i) for each of the one or more prerequisite services and the service, the one or more life cycle actions are sequential, (ii) each life cycle action is associated with a respective indicator of a plurality of indicators, (iii) the plurality of indicators are represented as a sequential list of indicators, and (iv) the plurality of life cycle ordering rules comprise:
 a first life cycle ordering rule that causes each life cycle action that is associated with a first indicator of the plurality of indicators to be skipped;
 a second life cycle ordering rule that causes, for each indicator of the plurality of indicators that (i) is not the first indicator and (ii) is associated with more than one life cycle action, a plurality of life cycle actions to execute concurrently; and
 a third life cycle ordering rule that causes one or more life cycle actions that are associated with a second indicator of the plurality of indicators to execute prior to one or more life cycle actions that are associated with a third indicator of the plurality of indicators, wherein the second indicator is listed before the third indicator in the sequential list of indicators.

9. A computer system comprising:
 one or more computer processors;
 one or more computer readable storage media;
 program instructions stored on the computer readable storage media for execution by at least one of the one or more processors, the program instructions comprising:
  program instructions to receive a request to deploy a service in a cloud computing environment;
  program instructions to query a service repository for data that describes one or more requirements of the service;
 program instructions to identify one or more prerequisite services based, at least in part, on the requirements of the service; and
 program instructions to dynamically generate a solution stack model from (i) a stack service model of the service and (ii) the one or more prerequisite services, wherein the solution stack model is based, at least in part, on the requirements of the service and wherein the service and the one or more prerequisite services execute concurrently via the cloud computing environment in accordance with the requirements of the service, and wherein the program instructions to dynamically generate a solution stack model comprises:
  program instructions to interweave one or more life cycle actions of the one or more prerequisite services with one or more life cycle actions of the service based, at least in part, on a plurality of life cycle ordering rules, wherein (i) for each of the one or more prerequisite services and the service, the one or more life cycle actions are sequential, (ii) each life cycle action is associated with a respective indicator of a plurality of indicators, and (iii) wherein the plurality of life cycle ordering rules comprise:

a first life cycle ordering rule that causes each life cycle action that is associated with a skip indicator of the plurality of indicators to be skipped; and a second life cycle ordering rule causes, for each indicator of the plurality of indicators that (i) is not the skip indicator and (ii) is associated with more than one life cycle action, a plurality of life cycle actions to execute concurrently.

10. The computer system of claim 9, wherein each of the one or more prerequisite services is identified based, at least in part, on one of a specific version number and a range of compatible version numbers.

11. The computer system of claim 9, wherein the requirements of the service include propagating a configured parameter to a specific prerequisite service of the one or more prerequisite services.

12. The computer system of claim 11, the program instructions further comprising:
    program instructions to determine that the specific prerequisite service is unable to accept the configured parameter and, in response, send an error message to a client.

13. The computer system of claim 11, wherein the configured parameter is a parameter that corresponds to a user-configurable setting of the specific prerequisite service.

14. The computer system of claim 9, the program instructions further comprising:
    program instructions to determine that one or more life cycle actions of a specific prerequisite service of the one or more prerequisite services are not in a predefined order and, in response, send an error message to a client.

15. The computer system of claim 9, wherein the one or more life cycle actions are interwoven such that one or more life cycle actions of the service are executed before all of the one or more life cycle actions of each of the one or more prerequisite services are complete.

16. A computer system comprising:
    one or more computer processors;
    one or more computer readable storage media;
    program instructions stored on the computer readable storage media for execution by at least one of the one or more processors, the program instructions comprising:
        program instructions to receive a request to deploy a service in a cloud computing environment;
        program instructions to query a service repository for data that describes one or more requirements of the service;
program instructions to identify one or more prerequisite services based, at least in part, on the requirements of the service; and
    program instructions to dynamically generate a solution stack model from (i) a stack service model of the service and (ii) the one or more prerequisite services, wherein the solution stack model is based, at least in part, on the requirements of the service and wherein the service and the one or more prerequisite services execute concurrently via the cloud computing environment in accordance with the requirements of the service, and wherein (i) for each of the one or more prerequisite services and the service, the one or more life cycle actions are sequential, (ii) each life cycle action is associated with a respective indicator of a plurality of indicators, (iii) the plurality of indicators are represented as a sequential list of indicators, and (iv) the plurality of life cycle ordering rules comprise:
    a first life cycle ordering rule that causes each life cycle action that is associated with a first indicator of the plurality of indicators to be skipped;
    a second life cycle ordering rule that causes, for each indicator of the plurality of indicators that (i) is not the first indicator and (ii) is associated with more than one life cycle action, a plurality of life cycle actions to execute concurrently; and
    a third life cycle ordering rule that causes one or more life cycle actions that are associated with a second indicator of the plurality of indicators to execute prior to one or more life cycle actions that are associated with a third indicator of the plurality of indicators, wherein the second indicator is listed before the third indicator in the sequential list of indicators.

17. The computer system of claim 16, wherein each of the one or more prerequisite services is identified based, at least in part, on one of a specific version number and a range of compatible version numbers.

18. The computer system of claim 16, wherein the requirements of the service include propagating a configured parameter to a specific prerequisite service of the one or more prerequisite services, and wherein the configured parameter is a parameter that corresponds to a user-configurable setting of the specific prerequisite service.

19. The computer system of claim 16, the program instructions further comprising:
    program instructions to determine that one or more life cycle actions of a specific prerequisite service of the one or more prerequisite services are not in a predefined order and, in response, send an error message to a client.

20. The computer system of claim 16, wherein the one or more life cycle actions are interwoven such that one or more life cycle actions of the service are executed before all of the one or more life cycle actions of each of the one or more prerequisite services are complete.

* * * * *